US006978018B2

(12) United States Patent
Zimmer

(10) Patent No.: US 6,978,018 B2
(45) Date of Patent: Dec. 20, 2005

(54) TECHNIQUE TO SUPPORT CO-LOCATION AND CERTIFICATION OF EXECUTABLE CONTENT FROM A PRE-BOOT SPACE INTO AN OPERATING SYSTEM RUNTIME ENVIRONMENT

(75) Inventor: Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 810 days.

(21) Appl. No.: 09/967,434

(22) Filed: Sep. 28, 2001

(65) Prior Publication Data

US 2003/0097581 A1 May 22, 2003

(51) Int. Cl.[7] ............................................. G06F 15/177
(52) U.S. Cl. ......................... 380/30; 713/200; 713/201
(58) Field of Search ............................ 380/30; 713/200, 713/201

(56) References Cited

U.S. PATENT DOCUMENTS 5,710,814 A * 1/1998 Klemba et al. ............. 713/173
5,857,144 A * 1/1999 Mangum et al. ........... 455/11.1

* cited by examiner

Primary Examiner—Thomas R. Peeso
(74) Attorney, Agent, or Firm—Blakely, Sokoloff, Taylor & Zafman LLP

(57) ABSTRACT

Techniques to support co-location and certification of executable content from a pre-boot space into an operating system kernel mode runtime environment. The invention enables platform firmware runtime drivers to be loaded into memory as executable images during a pre-boot process and subsequently mapped into an operating system's runtime environment when the operating system is booted so as to enable runtime services provided by the platform firmware runtime drivers to be called via operating system interfaces. Prior to loading the executable images, a type certification check that compares type structure information corresponding to a runtime driver's opcode with type structure information corresponding to an operating system interface used to call the runtime driver may be performed. Additionally, a runtime driver file integrity verification may also be performed using a digital signature and associated key. The runtime driver may be loaded from various platform storage devices, including flash devices and option ROMs.

29 Claims, 8 Drawing Sheets

```
1  WaitForNextTick (
2    IN struct _EFI_METRONOME_ARCH_PROTOCOL  *This,
3    IN UINT32 TickNumber
4  )
5  {
6    UINT8 CurrentState[10];
7    UINT32 *Ptr;

8    Ptr = &CurrentStates[9];
9    Ptr++;
10   Ptr++;
11   Ptr++;
12   *Ptr = Address_Of_Illegal_Function_To_Return;
13 }
```

TECHNIQUE TO SUPPORT CO-LOCATION AND CERTIFICATION OF EXECUTABLE CONTENT FROM A PRE-BOOT SPACE INTO AN OPERATING SYSTEM RUNTIME ENVIRONMENT

BACKGROUND OF THE INVENTION

1. Field of the Invention

The present invention concerns operating system environments in general, and a technique for migrating code in a pre-operating system environment into the operating system runtime environment with trust and integrity guarantees in particular.

2. Background Information

Modern firmware interface standards, such as extensible firmware interface (EFI) 1.0, provide a programmatic interface that operating system (OS) loaders use to bootstrap an OS kernel. This requires an operating system interface to interact with firmware interfaces that are mapped into a kernel virtual address at runtime. The kernel-mode nature of these firmware services means that an errant pointer or programming error in the firmware service can undermine the safety and security of the entire operating system (e.g., no memory protection between privileged agents "co-located" or both operating in supervisor mode or Ring 0), unless the entire kernel, in turn, is contained in something like a virtual machine monitor. This type-safety described herein is the root of a system security and fault-tolerance policy.

Currently, there are several techniques that purport to guarantee type-safety and consistency through use of such a virtual machine monitor scheme. For example, Microsoft's .NET's C# and Sun Microsystem's Java programming languages are new high-level languages that are used to generate a type-safe intermediate encoding (Common Language Runtime (CLR) and Java Virtual Machine Language (JVML), respectively) that is implemented at runtime. In order to guarantee safety at runtime (such as prevent aberrant, illegal behaviors that imperial the OS, including buffer overruns, illegal casts, etc.), these languages are pre-verified and then interpreted.

While the foregoing techniques provide for some level of safety, they have several drawbacks. For example, while the pre-verification is a one-time operation whose engendered latency can be countenanced inasmuch as most program loads engender some delay (such as access to persistent media from which to effect the load), the runtime interpretation has proven to be a performance issue in systems that implement C# or Java. In order to address this performance issue, many platforms that support the CLR or JVML perform a Just-In-Time compilation of the intermediate encoding into the microprocessor's native encoding. The problem therein is that there is no standardized mechanism to guarantee that the safety properties of the code have been preserved across this transformation.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE ILLUSTRATED EMBODIMENTS

In the following description, numerous specific details are provided to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
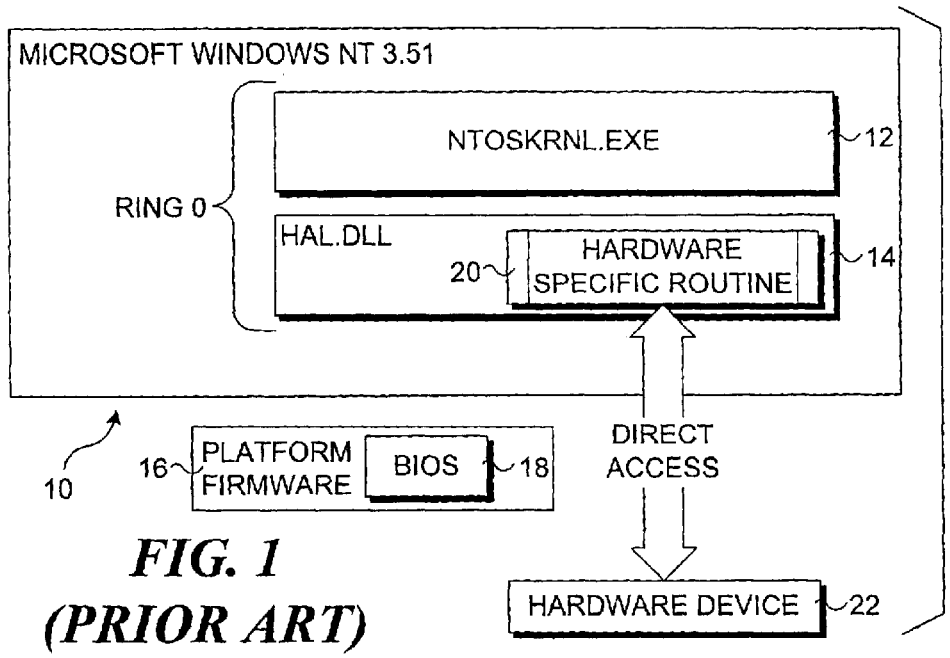
FIG. 1 is block schematic diagram of a convention scheme by which an operating system accesses a hardware devices.

Prior to the advent of EFI, the operational integrity of an operating system was ensured by the operating system's vendor through use of such measures as built-in integrity checks, substantial quality control testing, and by abstracting the operating system operations from those of other hardware and software components in a computer system. For example, an architecture diagram 10 corresponding to the Microsoft Windows NT operating system is illustrated in FIG. 1. Windows NT, as with most modern operating systems, includes a plurality of modules the interact with one another to provide various operating system functions and services, such as system I/O, keyboard processing, processor operations, disk access, etc. Included among these modules are an OS kernel (NTOSKRNL.exe) 12 and a hardware abstraction layer (HAL) dynamic link library (HAL.DLL) 14, each of which are run in the ring 0 level of the operating system, also known as the operating system's "kernel mode." The HAL.DLL is a driver that abstracts the OS kernel from the platform firmware 16, which includes PC BIOS 18.

In the legacy PC days, the PC BIOS did not have the sophistication to support runtime calls, so that an non-EFI aware HAL.DLL would implement hardware specific routines itself internally to access hardware devices instead of relying upon the legacy BIOS, as depicted by a hardware specific routine 20 and a hardware device 22. For example, to access a PC's Real-Time clock (RTC) chip, a HalGetTime service was used that would directly read the RTC's I/O ports of 70*h* and 71*h*, respectively, to retrieve the time. As a result, all PC motherboards had to include a hardware configuration that provided access to an RTC via these identical ports. However, on the plus side, the kernel and HAL components only needed to be validated under one configuration (i.e., everyone's hardware behaved the same), and a single image of the operating system could be used for all distributions.

Figure 2:
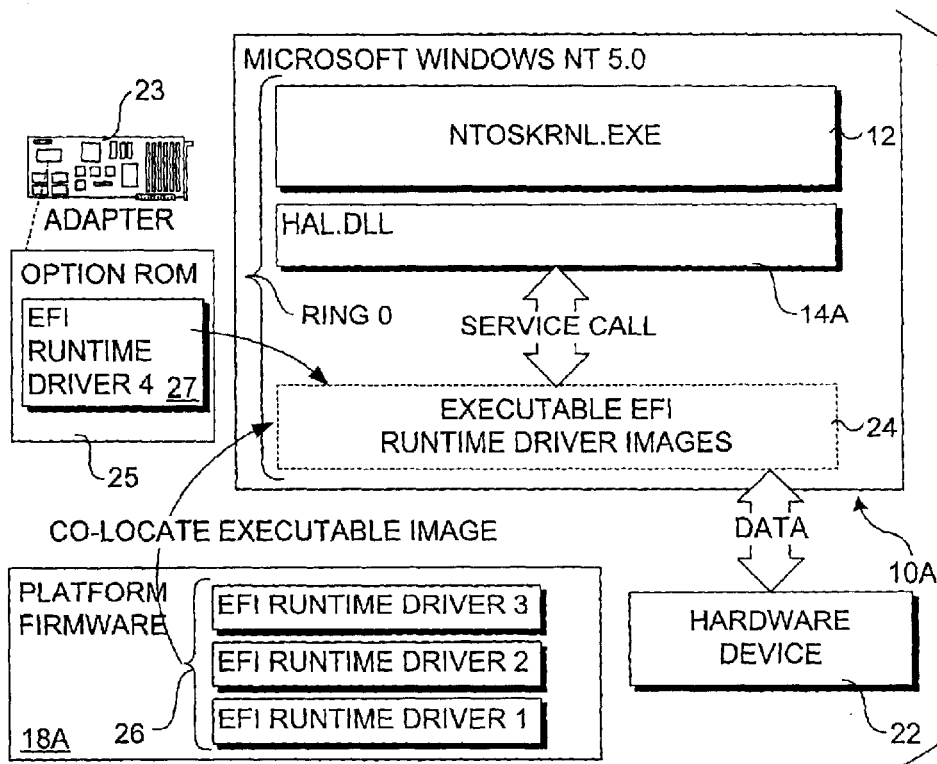
FIG. 2 is a block schematic diagram illustrating an exemplary method for accessing a hardware device via EFI runtime driver images that are co-located into an operating system memory space in accordance with the present invention.

As shown in FIG. 2, the architecture for accessing hardware devices under EFI is quite different. In this instance, the Microsoft Windows NT operating system (now labeled 10A) enables executable images 24 of EFI runtime drivers 26 stored in platform firmware 18A, which may be different for different platform vendors, to be loaded into the OS as runtime operating system drivers. Accordingly, the EFI-aware HAL.DLL (now labeled 14A) is portable for all EFI platforms and simply makes a service call into an appropriate runtime EFI driver to access a given hardware device on a given platform, and wherein the EFI runtime drivers are platform-specific rather than generic across all platforms. For example, the platform hardware can now include time-keeping chips that don't have to adhere to the legacy 70/71 port encoding, internal register structure, etc, required under the pre-EFI requirements (i.e., HAL.DLL doesn't need to know about the particular hardware I/O configuration), since the platform's firmware now only needs to provide the semantically-prescribed time-keeping services defined by the EFI specification (i.e., the EFI Runtime Service GetTime & SetTime which can now abstract very heterogeneous hardware topology). Another advantage of the EFI Runtime driver model is that there is a runtime interface abstracting the persistent variable store, which today is implemented with flash memory technology; legacy BIOS and platforms could not do this because OS didn't trust calling legacy BIOS at runtime, and the hardware access mechanisms for flash did not share the ubiquity of the simple hardware access mechanism of the real-time clock (e.g., access ports 70*h*/71*h*).

Another feature of EFI is that platform firmware can be extended via firmware that is not stored on a system's motherboard. For example, EFI enables firmware to be accessed from option ROM's on adapter cards, as depicted by an adapter card 23 that includes an option ROM 25 in which an EFI runtime driver 27 is stored.

One downside to this new paradigm is that the operating system vendor (i.e., Microsoft) is faced with a myriad of different software stacks comprising its own kernel and HAL layers atop third-party EFI firmware images provided by different platform vendors. Furthermore, since the third party EFI runtime drivers are run in ring 0 of the OS, the most trusted operating mode of the OS, there is a possibility that the OS can be caused to perform undesired functions as a result of flaws in these third party software components.

In addition to dealing with third-party EFI runtime drivers, the operating system vendor has no practical way of verifying the integrity of each of these different software stack configurations. Consider that platform vendors typically build 10's or 100's of thousands of a particular platform configuration, while operating system vendors such as Microsoft may sell 10's of millions of an operating system version. As a result, Microsoft is willing to spend enormous resources on developing good operating systems and validating the integrity of the operating systems. In contrast, since a platform vendor is producing much smaller volumes of products having a particular configuration, the platform vendor will generally spend less time and effort developing and testing their software components for each platform.

The present invention addresses the foregoing problem by providing a mechanism that guarantees that third-party EFI runtime drivers meet certain integrity tests before those EFI runtime drivers are allowed to be loaded and run within the operating system kernel mode environment. This mechanism only enables type-safe third-party code to be loaded and run, wherein the code is verified to be type-safe by examining annotated type structure information corresponding to the code. This type structure information, which includes interface type declarations, pre-condition and post-conditions from routines, typed memory allocations and casts, etc., is verified in a manner that guarantees that the code can only perform safe operations and avoid anomalies such as errant pointers and stack attacks.

Figures 3, 4:
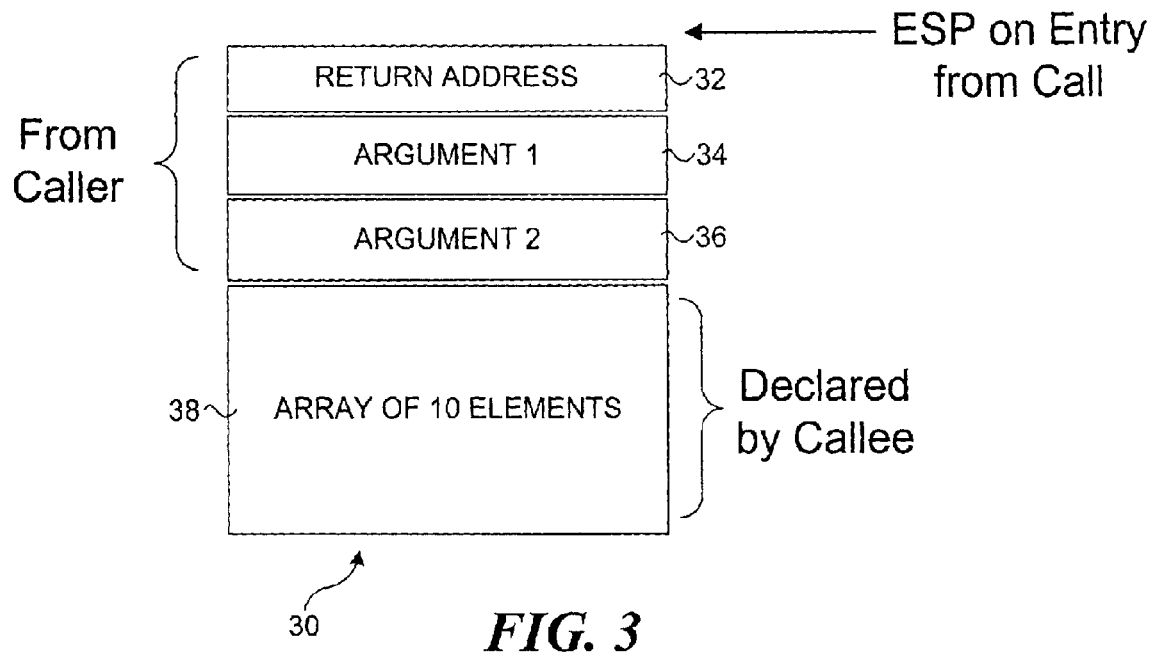
FIG. 3 is a block diagram illustrating various objects on a processor stack corresponding to a procedure that produces a stack smash when executed.
FIG. 4 is a source code listing corresponding to the procedure that produces the stack smash of FIG. 3.

With reference to the stack diagram of FIG. 3 and the source code listing 28 of FIG. 4 corresponding to an errant WaitForNextTick procedure, an example of a stack "smash" that results from execution the WaitForNextTick procedure occurs in the following manner. The WaitForNextTick procedure is called from a calling component (the "caller") that passes three parameters that are placed on a stack 30, including a return address 32, a first argument 34 (listed in line 2) comprising a C language structure, and a second argument (listed in line 3) comprising a 32-bit unsigned integer. Upon being called, WaitForNextTick, which comprises the "callee", declares an array in line 6 that allocates storage for 10 8-bit elements, which are added to the stack as an array 38. The processing code of the procedure then begins to executing, starting with line 8, wherein the pointer (Ptr) is assigned to the address of the last element in array 38 (in C, array elements begin with [0]. The pointer is then incremented by 1 three times in succession in lines 9, 10, and 11, resulting in the pointer sequentially referencing, the second argument, the first argument, and finally return address 32. In line 12, the value of the return address is then changed from its original value to the address of an illegal function to return. As a result, the stack is said to be smashed, causing the stack pointer (ESP) to point to the illegal function upon completion of the WaitForNextTick procedure rather than the caller's return address.

The present invention addresses problems such as the foregoing by using a type-safe compilation to compile original source code into a Type-Safe Assembly language, wherein a certifying compiler is used to verify that the compiled code is type-safe. Notably, the Type-Safe Assembly language is not an intermediate language encoding, such as JAVA, but rather comprises a subset of the full microprocessor's assembly language encoding. This ensures that errant code cannot be loaded and/or executed. For example, in the WaitForNextTick procedure, the type-safe compilation would look at precondition and post-condition information that describes the stack, and the certifying compiler would not have created the code that would cause the stack smash discussed above.

Figure 5:
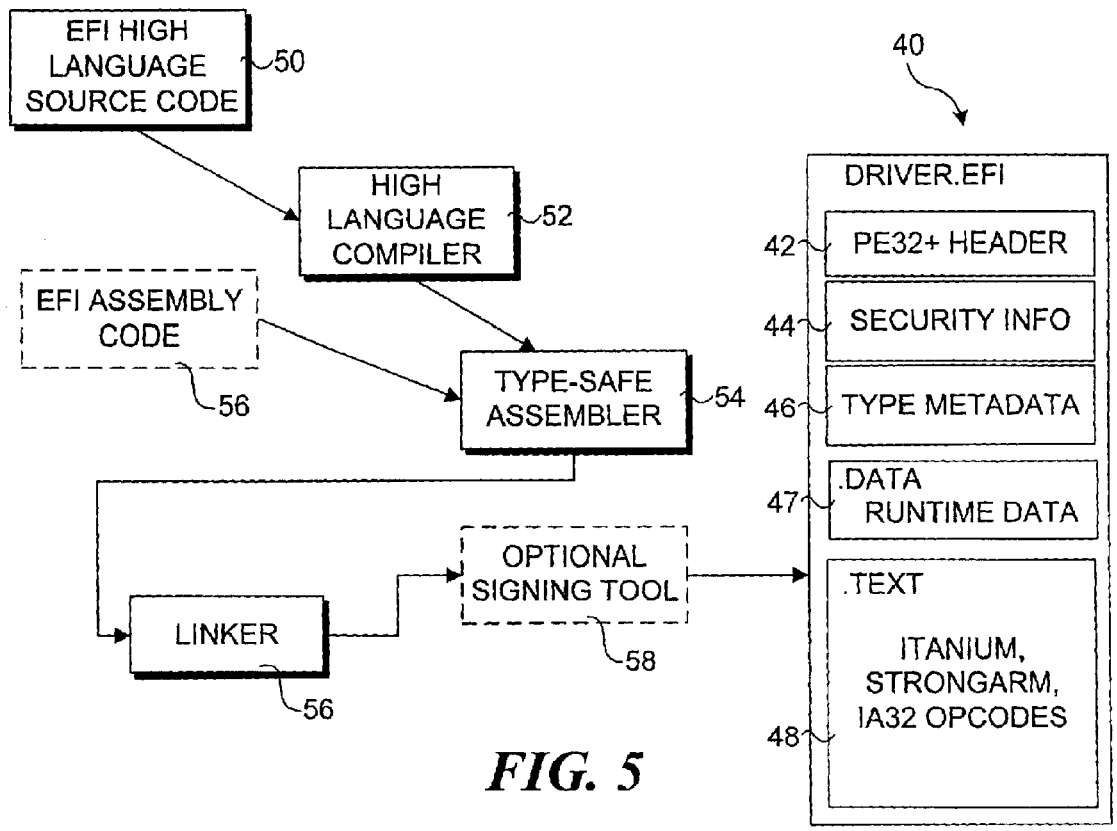
FIG. 5 is a block schematic diagram illustrating a process for building an EFI runtime driver image in accordance with the present invention.

An exemplary EFI runtime driver file (Driver.EFI) 40 that is built in accordance with one embodiment of the invention depicted by the process shown in FIG. 5. EFI runtime driver file 40 is a PE32+ file that includes a plurality of sections, including those shown in FIG. 5 and potential other sections as defined by the Portable Executable and Common Object File Format Specification authored by Microsoft and available at www.Microsoft.com/hwdev/efi. These sections include a header section 42, a security information section 44, a type metadata section 46, a .data section 47, and a .text section 48.

EFI runtime driver file 40 is built in the following manner. First, the source code corresponding to the EFI runtime driver is written in a high-level language, such as C or C++, in a block 50. The high-level language code is then compiled into an intermediate type-safe form, such as object code or assembly in a block 52. For example, EFI source code written in C may be compiled using a type-safe C compiler. This type-safe C compiler constrains the C code that can be used as input to be a subset of ANSI C, namely a type-safe dialect. Only code that meets these type-safe strictures shall compile into the intermediate, type-safe assembly-language dialect. The intermediate type-safe form is then processed using a type-safe assembler 54 to generate typed assembly language, which is then linked with a linker 56 to produce the EFI driver file. Optionally, a signing tool 58 may be used to generate a digital signature to authenticate the file.

Figure 6:
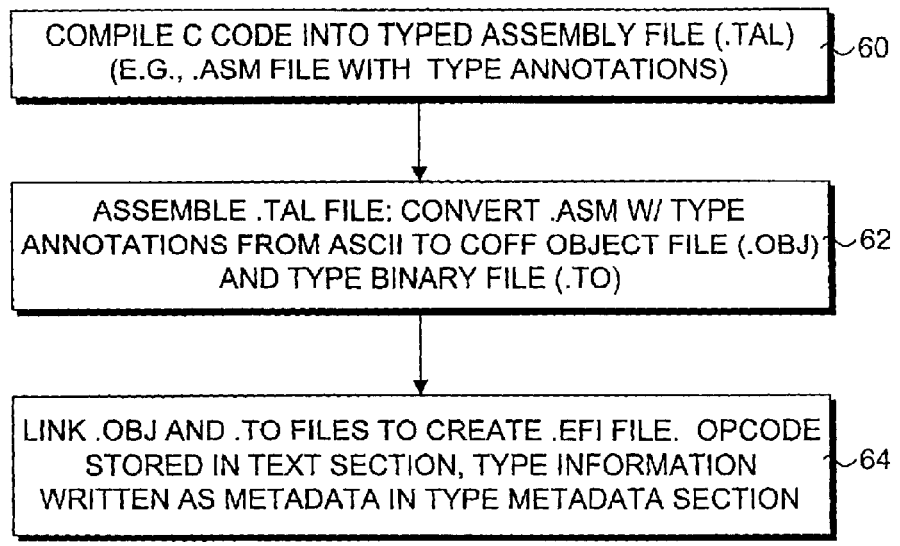
FIG. 6 is a flowchart illustrating a portion of the logic used when building an EFI runtime driver image in accordance with the process of FIG. 5.

More specific details in accordance with an embodiment of the invention that begins with an EFI source code file written in C are shown in the flowchart of FIG. 6. In a block 60, the C code is compiled into a typed assembly language (.TAL) file. For example, the .TAL file may comprise a .ASM file generated by Microsoft's MASM assembler that includes assembly language code annotated with type structure information, as described below. The .TAL file is then assembled in a block 62. This comprises converting the .ASM with type annotations file from ASCII to a COFF (Common Object File Format) (.OBJ) file and a type binary file (.TO). The .OBJ and .TO files are then linked in a block 64 to create executable opcode and any required runtime data. The opcode corresponding to the .OBJ file is stored in .text section 48 of the file and runtime data are stored in .data section 47, while type metadata corresponding to the .TO file is written to type metadata section 46 of the file.

The type information is used to specify the type structure of the opcode. This information can be accessed prior to load or code execution to verify that the driver matches expected type parameters defined by an operating system interface that is used to call a runtime service provided by the runtime driver.

For example, considering the following code segment:

```
EFI_STATUS
WaitForNextTick (
    IN struct _EFI_METRONOME_ARCH_PROTOCOL *This,
    IN UINT32 TickNumber
    )
```

Figure 7:
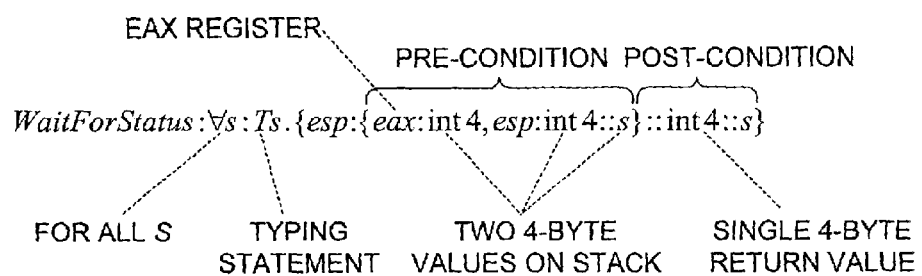
FIG. 7 illustrates various portions of a type definition in accordance with a TALx98 typed assembly language that is suitable for implementing aspects of the present invention.

The first item of interest is the WaitForNextTick procedure, which uses the WaitForStatus interface. This interface would have the following type information, which is also schematically depicted in FIG. 7:

WaitForStatus:∀s:Ts.{esp:{eax:int4,esp:int4::s}::int4::s}

This type information statement defines type structure of the interface for WaitForStatus; specifically, it symbolically describes a call-stack in mem s of stack element s and states that for all (the universal quantifier, or upside down "A") s, there is a typing T on s such that the eax register is used for parameter passing and there are two 4-byte (32-bit) values on the stack, and a single 4-byte (32-bit) return value. This is essentially a human-readable statement of the pre-condition and post-condition that must be maintained for the WaitForStatus interface and is a type template of the stack configuration. In one embodiment, the type-encoding describes this symbolic information in a binary fashion pursuant to the type system in use, and only code that purports to satisfy these constraints shall compile. The compiler will ensure that this pre-condition and post-condition is satisfied. In fact, this pre-condition and post-condition check is one aspect of the "certifying" nature of the compiler. Other certification steps carried out by a compiler at code generation time can include tracking pointer usage, type safe use of variables, the maintaining of a consistent model of heap allocation, and other constraints on the generated code.

With such type information describing the generated code and stored in a section of the runtime driver file, the operating system can optionally corroborate that the type information, such as the above-listed type declaration of the exposed service, is available and matches the external interfaces that the operating system calls into. Without such as declarative dataset describing the interface, the operating system vendor has to trust the type definitions of the firmware interface that have been provided in .h C header files. The problem with trusting a published document or a .h file is that the actual code in the runtime driver implementation might inadvertently differ from the published interface, have been errata'd without the operating system author's having been altered, or have been maliciously modified to break the interface use model. The type information in the code binary is a self-consistency check that obviates the human element from this process of mating interfaces.

An exemplary C source code file (list.c) and corresponding annotated type assembly file (list.tal) are presented below.

```
1.    /* Return the length of a list. */
2.    int length(list x) {
3.        int i = 0;
4.
5.        while (x != null) {
```

-continued

```
6.      ++i;
7.      x = x.t1;
8.   }
9.   return (i);
10. }
```

LIST.C

```
1.   TYPE      <List?listA =fn va:T4.^T(0)('List?list?mem va)>
2.   TYPE      <memTypeA = ^T(0)'memType?mem>
3.   TYPE      <List?list?:T4-!>T4 = List?listA>
4.   TYPE      <List?list?mem:T4-!>Tm 8 = fn va:T4. *[va^rw,('List?list?va)^rw]>
5.   CODE
6.   _List?length:
7.   LABELTYPE <All[va:T4 s1:Ts s2:Ts e1:Tcap e2:Tcap].code{cap: &[e1,e2],EBP:sptr (H e2
8.   s2)::s2,ESP:sptr (code{cap: &[e1,e2],ESP:sptr ('List?list? va)::s1@(H e2 s2)::s2,EBP:sptr (H e2
9.   s2)::s2,EAX:B4}}::('List?list? va)::s1@(H e2 s2)::s2}>
10.     MOV    ECX,DWORD PTR unroll([ESP+4])
11.  List?length$464:
12.     MOV    EBX,subsume(<B4>,0)
13.     JMP    tapp(whileTest$466,<va,s1,s2,e1,e2>)
14.  whileTest$466:
15.  LABELTYPE <All[va:T4 s1:Ts s2:Ts e1:Tcap e2:Tcap].code{cap: &[e2,e1],EBP:sptr (H e2 s2)::s2,ECX:List?listA
16.  va,EBX:B4,ESP:sptr (code{cap: &[e1,e2],ESP:sptr ('List?list? va)::s1@(H e2 s2)::s2,EBP:sptr (H e2
17.  s2)::s2,EAX:B4}}::('List?list? va)::s1@(H e2 s2)::s2}>
18.     NAMEOBJ   nm?$0,ECX
19.     CMP    ECX,0
20.     JE     whileEnd$467       virtual<  COERCE sum(<List?listA va>,forgetname(ECX))>
21.     MOV    EAX,EBX
22.     ADD    EAX,1
23.     MOV    EBX,EAX
24.     MOV    EAX,DWORD PTR unroll([unroll(forgetname(ECX))+4])
25.     MOV    ECX,EAX
26.     JMP    tapp(whiieTest$466,<va,s1,s2,e1,e2>)
27.  whileEnd$467:
28.     MOV    EAX,EBX
30.     RETN
```

LIST.TAL

The type information is defined in the sections starting with "LABELTYPE," i.e., lines 7–9 and lines 15–17. The foregoing type annotation grammar corresponds to the TALx86 Typed Assembly Language developed at Cornell University, and may be used on Intel IA32 processors. Similar techniques may be applied for other processors, including Intel Itanium and StrongARM assembly languages.

Other heavier techniques to effect the same end are George Necula's Proof-Carrying Code, wherein a proof of the program behavior is carried with the code. This has been used to verify mobile code, such as that for network applications, such as downloadable network router applets.

Another aspect of the invention concerns the use of type-safe EFI runtime drivers. Typically, type-safe drivers might be used in systems with more pronounced integrity and/or security constraints. Since type metadata is not presently required, such systems might implement use of type-safe drivers by means of an optionally-required type metadata adjunct to driver images.

Figure 8:
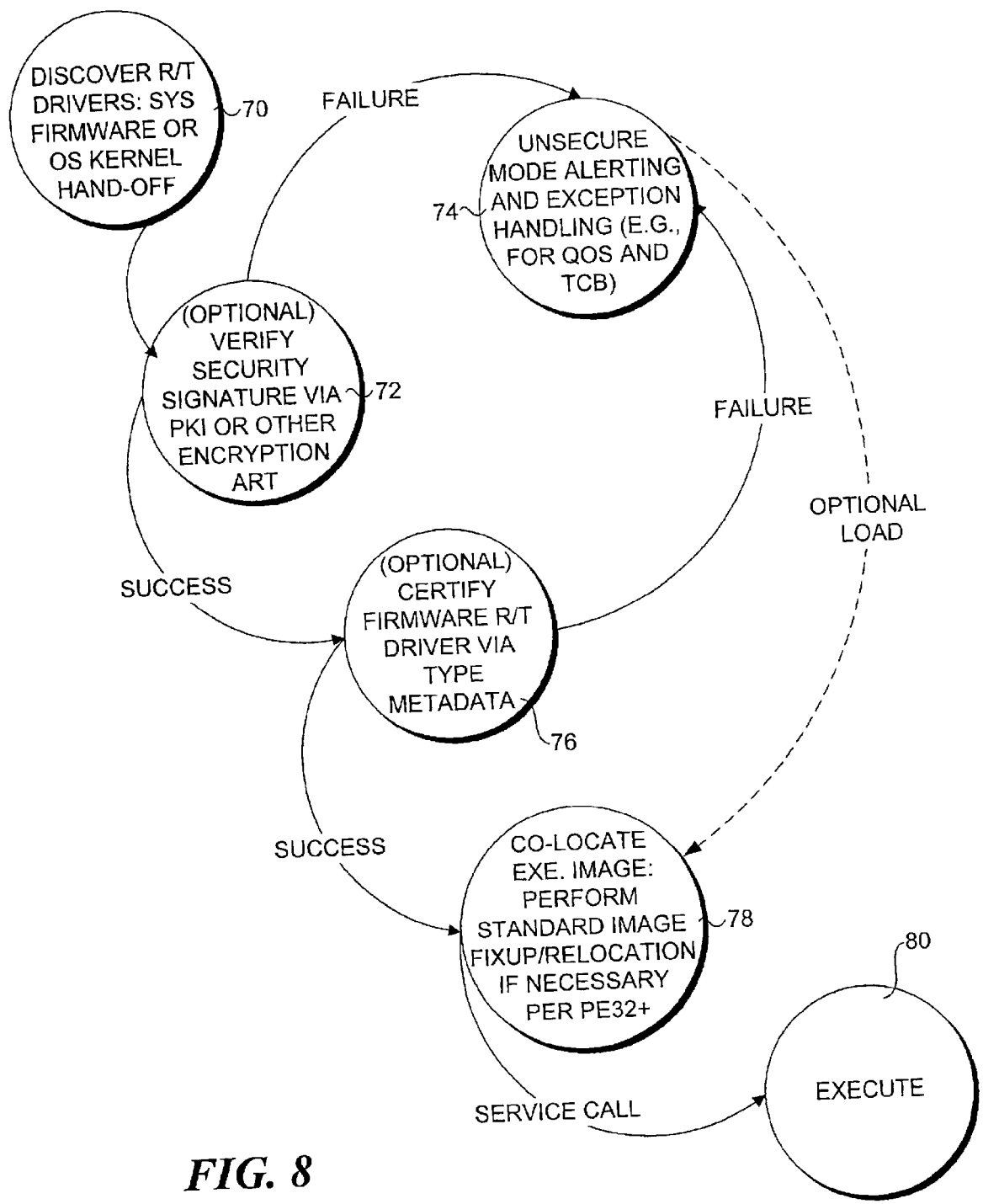
FIG. 8 is a machine state diagram illustrating various machine states that may be encountered during digital signal verification, type certification and loading of an EFI runtime driver image in accordance with the present invention.

For example, an exemplary runtime flow is illustrated by the state diagram of FIG. 8. The system state begins in an image discovery state 70 in which one or more runtime driver images are discovered. This typically will occur during the pre-boot (i.e., prior to booting the operating system) process, wherein the EFI runtime drivers are "dis-covered" by system initialization code that is used to initialize a computer system. Optionally, an OS kernel hand-off is performed, which entails the operating system discovering the physical mode EFI driver and data sections and mapping them into the Kernel Virtual Address (KVA). Next, in an optional signature verification state 72, the optional security (i.e., digital) signature is verified using an appropriate digital signal authentication technique, such as PKI (public-key infrastructure, see www.rsasecurity.com, FAQ Version 4.1, May 2000, section 4.1.3.1), which used a public key to verify the integrity of files. Other encryption art may also be used. Typically, digital signatures are used to ensure that files have not been altered from an original form, wherein an encrypted digital signature is generated based, in part, on data in an original file and is added to the original file. When the file is authenticated, a comparison of the data contained in file and the encrypted digital signature is made, using an appropriate encryption key. If the file has been altered, the encrypted digital signature will no longer correspond to the file's data, indicating that the file is invalid. If the driver image cannot be verified using its digital signature, then it is passed to a failure state 74 that provides for exception handling and unsecure mode alerts, such as those used Quality of Service (QOS) and Trusted Computing Base (TCB) environments.

In events in which digital signatures are verified or digital signature verification is not performed, the state advances to an optional image certification state 76 in which a certification check is performed against the opcode of the runtime driver using the driver file's corresponding type metadata. For example, for a given OS interface, certain type parameters must be met based on prototype definitions for those interfaces. Since the type metadata describe the underlying type structure of the driver's opcode, the type-safety of the opcode can be verified if the type metadata matches the type definitions provided by any interfaces that are to used to interface with the runtime driver. Optionally, other types of certification checks can be performed, such as comparing pre-condition and post-condition type structures with corresponding runtime driver type metadata. If the runtime driver cannot be certified due to a conflict between the type metadata and applicable interface type definitions, the state is advanced to failure state 74, which again provides appropriate exception handling and unsecure mode alerting functions.

In cases in which images are successfully certified, the image is made available to the operating system to use via an executable image co-location process. Optionally, there may be instances in which a type-certification check is failed, but the failure is determined to be of such a minor nature that it is handled through an exception handling function that passes the executable image on for co-location, as depicted by an "OPTIONAL LOAD" path in FIG. 8. Furthermore, there may be other instances in which neither signature verification or type certification is performed, in which case execution image co-location is directly performed. In one embodiment, as depicted by a co-locate image state 78, an executable image of the driver is "co-located" into the privileged memory space (i.e., kernel mode runtime environment) of the operating system, further details of which are described below. This process may further include standard image fixup and relocation tasks defined by the PE32+ specification, which are performed as necessary. Upon completion of these tasks, the co-located EFI driver may be executed at runtime through use of a corresponding service call, as depicted by an execution state 80.

Figure 9A:
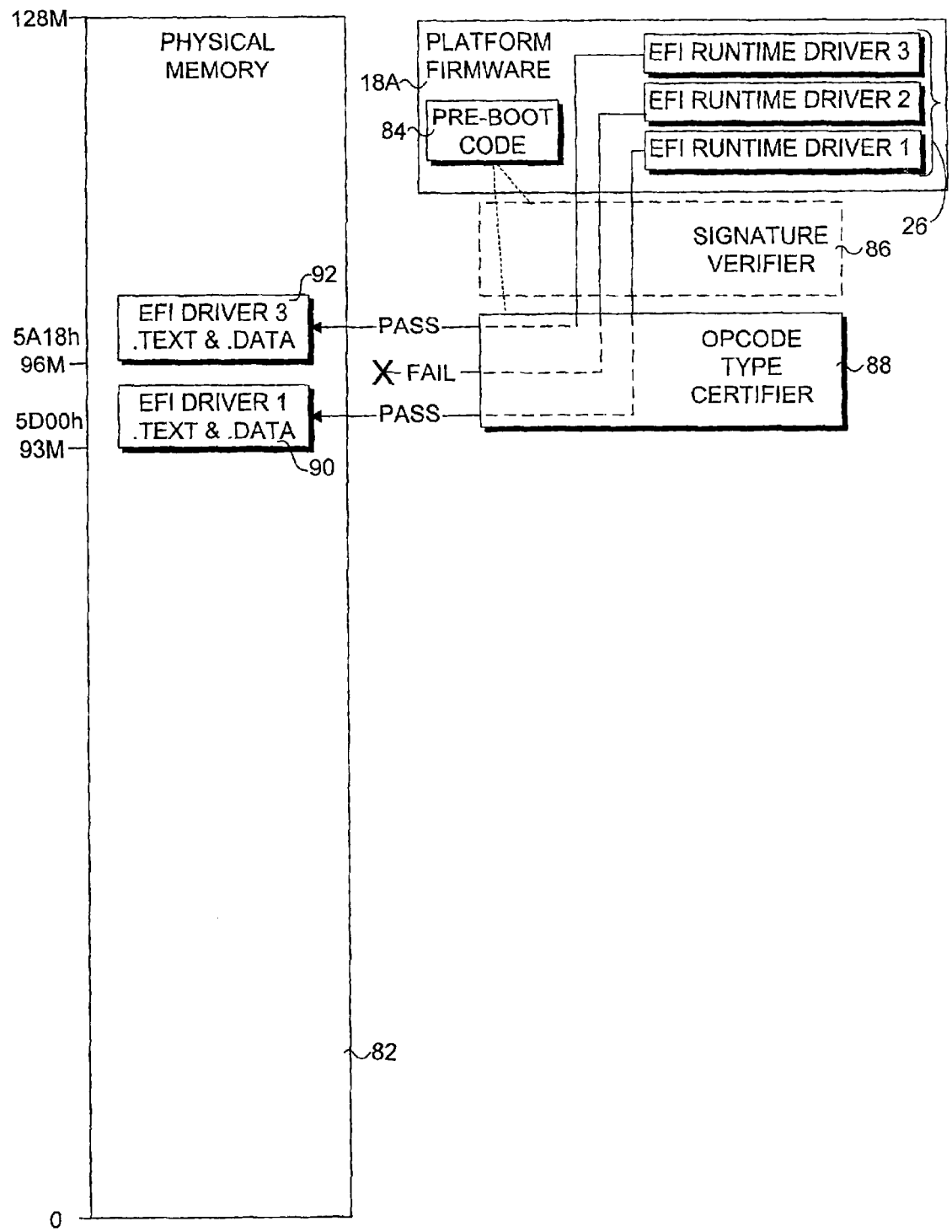
FIG. 9A is a block schematic diagram illustrating pre-boot operations that are performed during signature verification, type certification, and memory loading of an EFI runtime driver image loaded from platform firmware in accordance with the present invention.
Figure 9B:
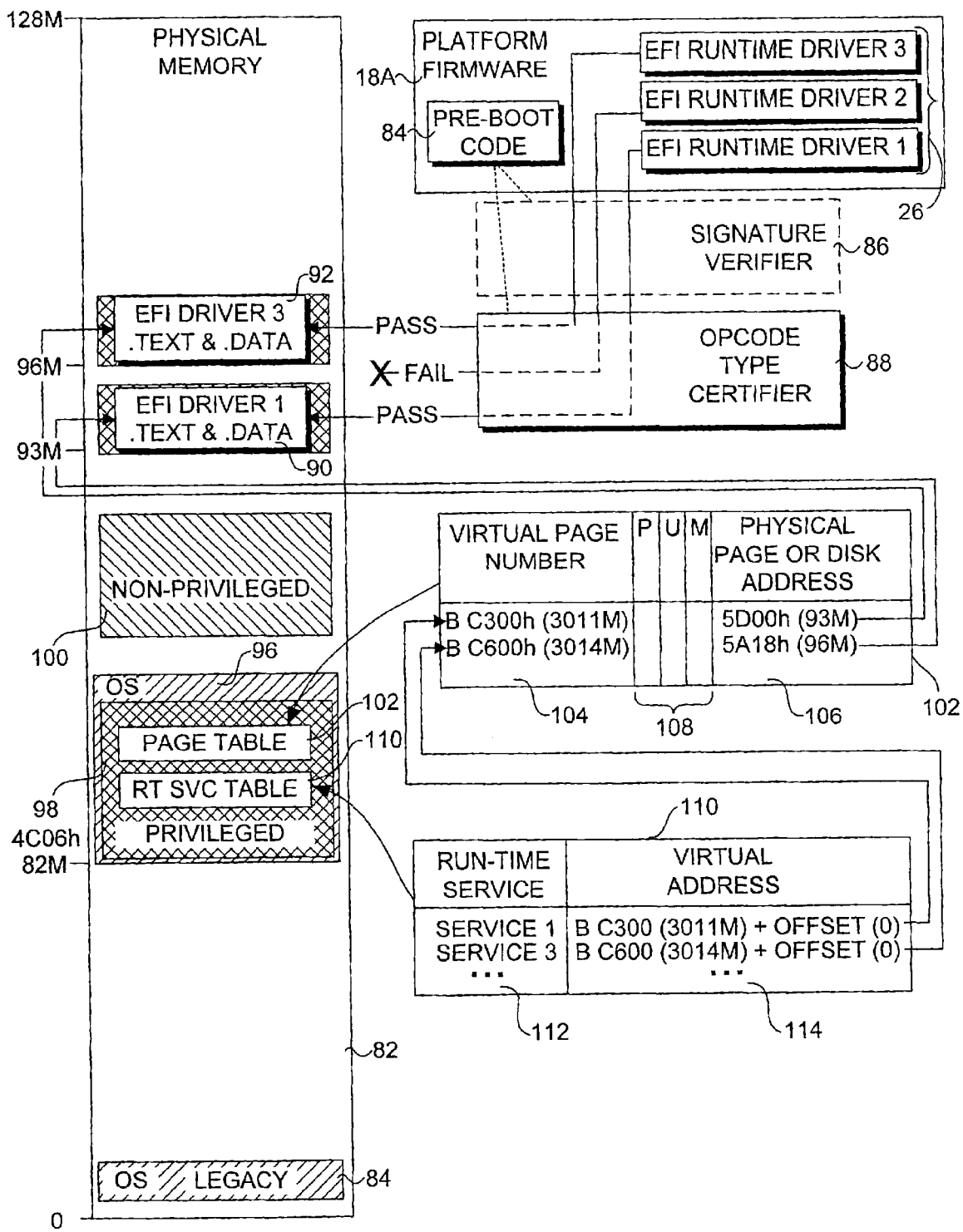
FIG. 9B illustrates operating system operations that are performed by an operating system to co-locate EFI runtime driver images into an operating system memory space.

With reference to FIGS. 9A and 9B, a process for co-locating executable images corresponding to three EFI runtime driver files 26 stored in platform firmware 18A into an operating runtime environment proceeds as follows. During the preboot process, various platform firmware code, depicted as pre-boot code 84, are loaded from platform firmware 18A (and/or other firmware devices) and executed by the system processor, enabling discovery of EFI runtime driver files 26 stored in the platform firmware. Pre-boot code 84 also includes an optional signature verifier 86 and an opcode type certifier 88, which are also loaded for execution during the pre-boot process.

Upon being discovered, an optional digital signature verification process is performed by signature verifier 100 on each runtime driver file in the manner discussed above with reference to signature verification state 72. An optional type certification check of the opcode corresponding to each driver image may then be performed by an opcode type certifier 102 in the manner discussed above with reference to image certification state 76. In this example, it is assumed that each of EFI runtime drivers 1 and 3 pass the type certification check, while EFI runtime driver 2 fails the check.

Upon passing the type certification check, an executable image comprising the .text (i.e. opcode) and .text (i.e., runtime data) portions of the EFI runtime driver files are loaded into physical memory. In this example, a computer system having a physical memory space 82 comprising 128 megabytes of system RAM is used, wherein the executable image (.text and .data sections) 90 of EFI runtime driver file 1 are loaded into the physical memory space beginning at a physical memory address of 5D00h (93 megabytes) and the executable image (.text and .data sections) 92 of EFI runtime driver file 3 are loaded into the physical memory space beginning at a physical memory address of 5A18h (96 megabytes). (It is noted that the physical memory locations of the various objects that are loaded into memory as depicted in FIGS. 9A and 9B are merely exemplary and the sizes depicted are exaggerated for clarity.) This completes the first phase of the certification and co-location process.

In the second phase, various operating system components are loaded into RAM during the operating system boot. Generally, legacy components and code for managing windows and graphic applications, such as the USER and GDI components (collectively depicted as legacy 94) are loaded into "real-mode" memory, i.e., memory having a physical address of <=640 K, while other portions of the OS are loaded into "protected mode" memory, i.e., memory having a physical address of >640 K. "Protected mode" memory is also commonly referred to as "extended" memory. In Microsoft's more recent operating systems, the bulk of the operating system, including the virtual machine manager and kernel, is loaded into extended memory, as depicted by operating system 96, which is loaded in physical memory space 82 at a beginning physical address of 4C06h (82 megabytes).

In Microsoft Windows operating systems, system memory is partitioned into a privileged memory space 98 and a non-privileged memory space 100. In Windows NT and Windows 2000 operating systems, the privileged memory space includes code running in Ring 0 of the processor, also referred to as privilege level 0, the most trusted execution mode of the OS. Less trustworthy software components, such as user applications, are run in non-privileged space 100, also known as privilege level 3 so as to ensure that user application anomalies do not cause the operating system to crash.

Rather than reference the starting addresses of executables and services, modern operating systems use virtual addressing schemes, wherein the starting address for an executable or service is referenced by a virtual address, and a page table is used to map virtual addresses to corresponding physical addresses. An exemplary page table 102 is depicted in FIG. 9B, which includes a virtual page number column 104, a physical page or disk address column 106, and access code columns 108. The page table is located in privileged memory space 99, the location of which is specified by control register 3 (CR3) on Intel processors having 32-bit architectures (IA-32 processors).

Virtual page number column 104 specifies the virtual page for a given virtual address segment. Both virtual and physical addresses are defined by a page identifier (e.g., number) and an address offset. Since address offsets are the same for both virtual and physical address, there is no need to map this information. In 32-bit addressing schemes, there are 4 gigabytes of address space. The address space is divided into "pages." Each of these pages typically comprise 4 K (4096 bytes) or 8 K (8192 bytes) of physical memory, wherein the maximum address offset is equal to the page size—1. Accordingly, only unique page identifiers, such as virtual and physical page numbers, need to be provided in page table 92.

Co-locating EFI runtime driver executable images into the privileged OS runtime environment is accomplished by setting the virtual address space of each executable image that has been previously loaded into memory with a SetVirtualAddress operating system call. This adds a virtual address range corresponding to the physical address space occupied by each EFI runtime service executable image to the operating system's privileged memory space, and defines the virtual starting address for each service, wherein the latter are stored in a runtime service table 110 that includes a runtime service column 112 and a virtual address column 114. The service name or other service identifier is stored in runtime service column 112. A virtual page and offset corresponding to the starting virtual address of the service is stored in virtual address column 114. This data will typically be stored in hexadecimal. In this example, the operating system is "re-located" from its physical memory starting address 4C06h (82 megabytes) to an starting address of B B800h (3 gigabytes). Accordingly, physical memory address 5D00h (93 megabytes) corresponding to EFI runtime driver 1 image 90 is mapped to a physical address of 3000 M+93 M−82 M=B C300h (3011 megabytes), while physical memory address 5A18h (96 megabytes) corresponding to EFI runtime driver image 92 is mapped to a virtual address of B C600h (3014 megabytes). At this point, services provided by a co-located EFI runtime driver executable image can be accessed using an appropriate service call from an operating system runtime component, such as HAL.DLL.

In addition to enabling EFI runtime drivers to be loaded from platform firmware, similar drivers can be loaded from option ROMs. For example, many computer systems include one or more SCSI drives that require a SCSI adapter card to access the drives, such as an Adaptec 2940 SCSI card, which includes an option ROM. Under the prior art, the option ROM is blindly loaded by BIOS into memory and executed. The option ROM publishes an Int13h service, which is used by OS loaders in conventional systems to load the OS.

Under EFI, the Adaptec option ROM comprises an EFI runtime driver that publishes and instance of the BLOCK_IO protocol. In an exemplary use case, suppose a platform vendor, such as Dell, desires to verify the option ROM EFI driver provides the correct interfaces. This can be accomplished by probing the type information from the BLOCK_IO driver in the ROM with the opcode type certifier to verify its integrity. Optionally, if the option ROM is signed with a digital signature, the signature verifier could be used to verify the integrity of the file.

Figure 10:
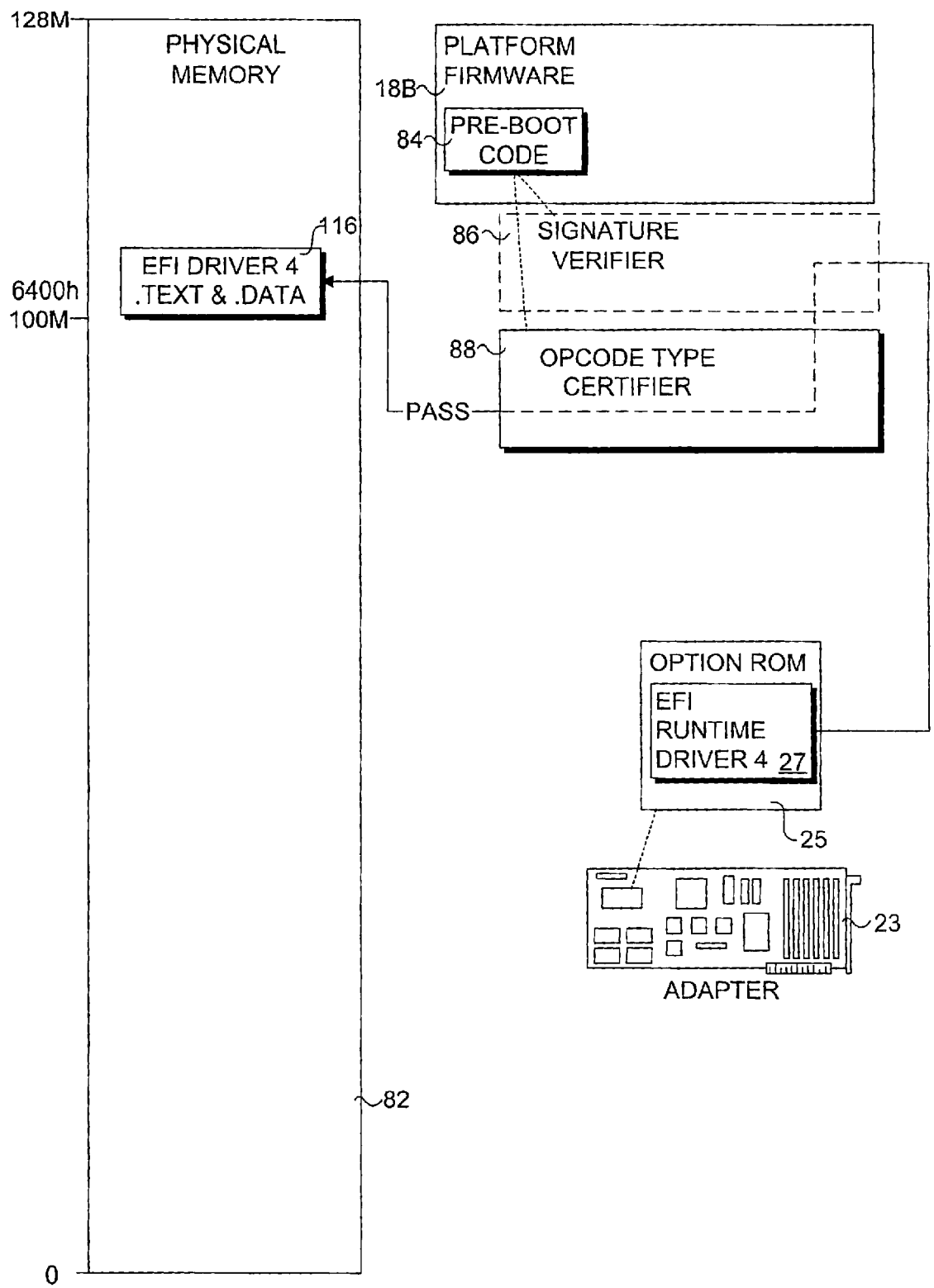
FIG. 10 is a block schematic diagram illustrating pre-boot operations that are performed during signature verification, type certification, and memory loading of an EFI runtime driver image loaded from an option ROM in accordance with the present invention.

An example of certifying and co-locating an executable image corresponding to an EFI runtime driver 27 stored in option ROM 25 is illustrated in FIG. 10. During the pre-boot operation, the system scans for various EFI runtime drivers, including those stored in any option ROMs on adapter cards connected to the system's expansion bus via expansion slots. Upon discovery of EFI runtime driver 27, an optional signature verification is performed by signature verifier 86 in the manner discussed above. Type certification of the runtime driver is then performed by opcode type certifier 88 by examining the type metadata for the EFI runtime driver file with the type structure definition for an interfaces (system and OS) that the EFI driver purports to work with. If the type certification check is successful, an executable image 116 comprising the .text & .data portions of the EFI runtime driver file is loaded into system memory 82. The operating system can then finish the co-location process by mapping the address range for the executable image into its runtime memory space in the manner discussed above.

The present invention provides several advantages over existing art. For example, there are currently no programmatic, discoverable integrity guarantees for EFI runtime services. In fact, EFI drivers can be virtually relocated by an operating system to any virtual address, so even if a platform provider performs substantially comprehensive testing, many possible environmental permutations will never be tested; testing only proves presence of bugs, not absence. As discussed above, the ability of an EFI driver's runtime code to perform any memory or I/O instruction means that an errant or malicious EFI runtime driver can imperil the stability of security of an entire operating system. In contrast, the appropriate use of the present invention guarantees that such errant and malicious EFI runtime drivers are never run.

The invention also enhances the performance of platforms on which it is implemented. For instance, the invention enables platform firmware components to be co-located in the operating system and executed at native binary speed in the operating system runtime environment. This is a compelling feature in that the operating system vendor can trust every dimension of the co-located code, from the safety properties to security attributes. As a result, the functionality of the operating system can be extended by third-party code without affecting the integrity of the operating system.

The invention also provides speed and integrity/security features over typed-intermediate languages, such as JAVA. For example, in contrast to type-intermediate languages, services and modules built using the techniques of the present invention do not require an untrusted and potentially errant Just-in-Time compilation processor or slow interpreter to be executed. Since typed assembly language is used, the code compiles to direct machine code, which executes significantly faster that intermediate language code requiring interpretation or Just-in-Time compilation.

Exemplary Computer System for Practicing the Invention

Figure 11:
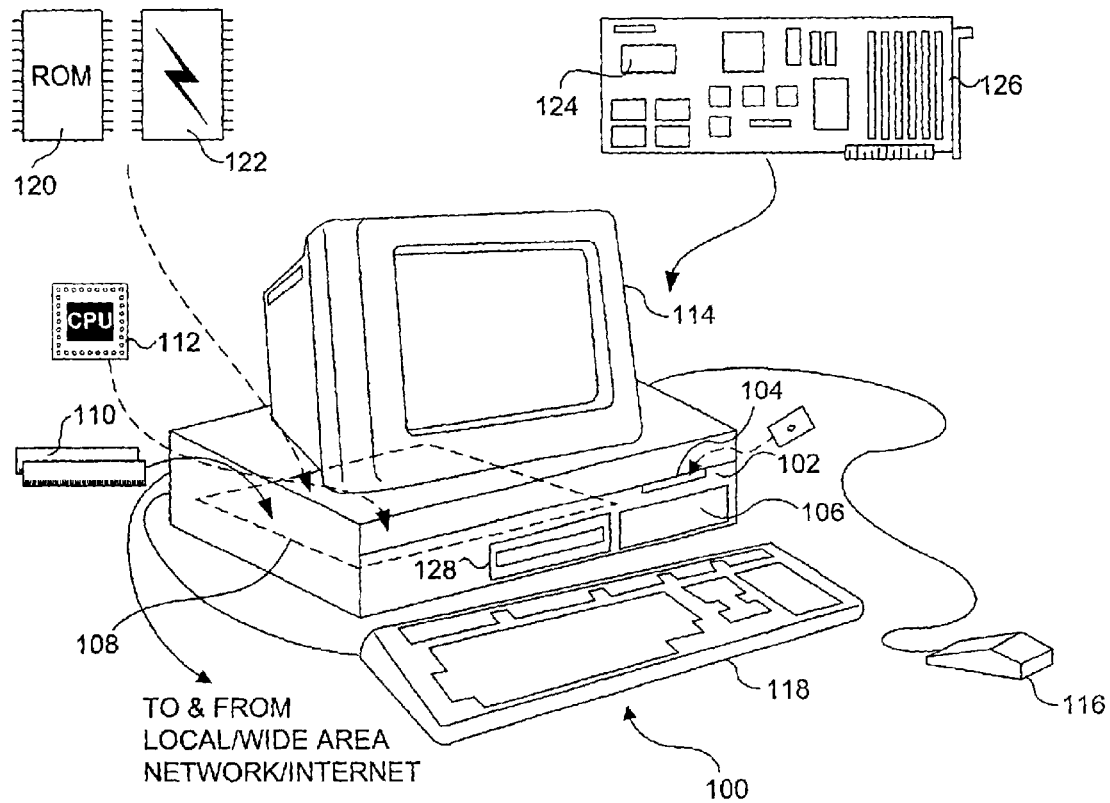
FIG. 11 is a schematic diagram illustrating a computer system that is suitable for implementing the present invention.

With reference to FIG. 11, a generally conventional computer 100 is illustrated, which is suitable for use in connection with practicing the present invention, and may be used for running client-side software comprising one or more software modules that implement the various functions of the invention discussed above. Examples of computers that may be suitable for clients as discussed above include PC-class systems operating the Windows NT or Windows 2000 operating systems, Sun workstations operating the UNIX-based Solaris operating system, and various computer architectures that implement LINUX operating systems. Computer 100 is also intended to encompass various server architectures, as well as computers having multiple processors.

Computer 100 includes a processor chassis 102 in which are mounted a floppy disk drive 104, a hard drive 106, a motherboard 108 populated with appropriate integrated circuits including memory 110 and one or more processors (CPUs) 112, and a power supply (also not shown), as are generally well known to those of ordinary skill in the art. It will be understood that hard drive 106 may comprise a single unit, or multiple hard drives, and may optionally reside outside of computer 100. A monitor 114 is included for displaying graphics and text generated by software programs and program modules that are run by the computer. A mouse 116 (or other pointing device) may be connected to a serial port (or to a bus port or USB port) on the rear of processor chassis 102, and signals from mouse 116 are conveyed to the motherboard to control a cursor on the display and to select text, menu options, and graphic components displayed on monitor 116 by software programs and modules executing on the computer. In addition, a keyboard 118 is coupled to the motherboard for user entry of text and commands that affect the running of software programs executing on the computer. Computer 100 also includes a network interface card (not shown) for connecting the computer to a computer network, such as a local area network, wide area network, or the Internet.

Computer 100 also includes platform firmware, which will typically comprise firmware stored in ROM components 120, such as flash memory devices 122, which are mounted on motherboard 108. Optionally, a portion of the firmware may be loaded from an option ROM 124 component of an adapter card 126 coupled to one of the motherboards expansion slots (not shown).

Computer 100 may also optionally include a compact disk-read only memory (CD-ROM) drive 128 into which a CD-ROM disk may be inserted so that executable files and data on the disk can be read for transfer into the memory and/or into storage on hard drive 106 of computer 100. Other mass memory storage devices such as an optical recorded medium or DVD drive may be included. The machine instructions comprising the software that causes the CPU to implement the functions of the present invention that have been discussed above will likely be distributed on floppy disks or CD-ROMs (or other memory media) and stored in the hard drive until loaded into random access memory (RAM) for execution by the CPU. A portion of the machine instructions may also be loaded for execution from ROM 120, flash memory device 122 or option ROM 124. Optionally, all or a portion of the machine instructions may be loaded via a computer network.

Although the present invention has been described in connection with a preferred form of practicing it and modifications thereto, those of ordinary skill in the art will understand that many other modifications can be made to the invention within the scope of the claims that follow. Accordingly, it is not intended that the scope of the invention in any way be limited by the above description, but instead be determined entirely by reference to the claims that follow.

What is claimed is:

1. A method comprising:
 creating a runtime driver file including opcode corresponding to a runtime driver that performs a service when executed by a processor and type metadata describing type structure information pertaining to the opcode;
 determining type structure information corresponding to an operating system interface; and
 performing a type certification check of the runtime driver by comparing the type structure information corresponding to the opcode against the type structure information corresponding to the operating system interface.

2. The method of claim 1, further comprising enabling the runtime driver to be called by the operating system via the operating system interface if the certification check is passed.

3. The method of claim 2, where in enabling the runtime driver to be called by the operating system via the operating system interface comprises co-locating an executable image corresponding to the runtime driver into an operating system runtime environment.

4. The method of claim 3, wherein the operating system runtime environment comprises a memory space that is only accessible to a kernel mode of the operating system.

5. The method of claim 1, further comprising:
 signing the runtime driver file with a digital signature; and
 verifying an integrity of the runtime driver file using a digital signature key to determine whether the runtime driver has been altered from an original form.

6. The method of claim 1, wherein the runtime driver corresponds to an extensible firmware interface (EFI) runtime driver.

7. The method of claim 1, wherein the runtime driver file is created by performing the operations of:
 compiling source code corresponding to the runtime driver into a typed assembly language comprising assembly language instructions that are annotated with type structure information;
 generating an executable image comprising opcode and any required runtime data corresponding to the type assembly language instructions and writing the executable image to the runtime driver file;
 extracting type metadata pertaining to the type structure information and storing the type metadata in the runtime driver file.

8. The method of claim 7, wherein the typed assembly language comprises the TALx86 language.

9. The method of claim 1, wherein the runtime driver file is stored in an option ROM.

10. A method comprising:
 loading an executable image corresponding to a platform firmware runtime driver into a computer system memory prior to booting an operating system that runs on the computer system;
 mapping a portion of the computer system memory in which the executable image is loaded into a runtime environment corresponding to the operating system; and
 enabling the executable image to be called by the operating system as a runtime service.

11. The method of claim 10, wherein the portion of memory in which the executable image is loaded is mapped into the operating system such that it is only accessible to an operating system kernel mode.

12. The method of claim 10, wherein the platform firmware runtime driver is stored in a platform firmware device as a runtime driver file comprising opcode that performs a service when called by an operating system interface and type metadata describing type structure information pertaining to the opcode, further comprising performing a type certification check of the platform firmware runtime driver by comparing the type structure information corresponding to the opcode against type structure information corresponding to the operating system interface.

13. The method of claim 10, wherein the platform firmware runtime driver is stored in a platform firmware device as a runtime driver file including a digital signature used to authenticate the runtime driver file, further comprising verifying an integrity of the runtime driver file using a digital signature key to determine whether the runtime driver file has been altered from an original form.

14. The method of claim 10, wherein the platform firmware runtime driver is stored in an option ROM contained on an adapter card.

15. A machine-readable media on which a plurality of machine are stored that when executed by a machine perform the operations of:
 performing a type certification check of a platform firmware runtime driver stored in a platform firmware device as a runtime driver file comprising opcode that performs a service when called by an operating system interface and type metadata describing type structure information pertaining to the opcode by comparing the type structure information corresponding to the opcode against type structure information corresponding to the operating system interface.

16. The machine-readable media of claim 15, wherein the type certification check is performed prior to booting an operating system corresponding to the operating system interface that runs on the machine.

17. The machine-readable media of claim 15, wherein execution of the machine instructions by the machine further performs the operation of loading an executable image corresponding to the platform firmware runtime driver into a machine memory.

18. The machine-readable media of claim 15, wherein the runtime driver file further includes a digital signature used to authenticate the runtime driver file, and wherein execution of the machine instructions by the machine further performs the operation of verifying an integrity of the runtime driver file using a digital signature key to determine whether the runtime driver file has been altered from an original form.

19. The machine-readable media of claim 15, wherein the platform firmware device comprises an option ROM contained on an adapter card.

20. A computer system comprising:

a processor;

a platform firmware storage device, operatively coupled to the processor, in which a runtime driver file corresponding to a platform firmware runtime driver is stored; and a memory in which a plurality of machine instructions are stored that when executed by the processor performs the operations of:

loading an executable image corresponding to the platform firmware runtime driver into the memory prior to booting an operating system that runs on the computer system;

mapping a portion of the memory in which the executable image is loaded into a runtime environment corresponding to the operating system; and enabling the executable image to be called by the operating system as a runtime service.

21. The computer system of claim 20, wherein the portion of memory in which the executable image is loaded is mapped into the operating system such that it is only accessible to an operating system kernel mode.

22. The computer system of claim 20, wherein the runtime driver file comprises opcode that performs the runtime service when called by an operating system interface and type metadata describing type structure information pertaining to the opcode, and wherein execution of the plurality of machine instructions by the processor further performs the operation of performing a type certification check of the platform firmware runtime driver by comparing the type structure information corresponding to the opcode against type structure information corresponding to the operating system interface.

23. The computer system of claim 20, wherein the runtime driver file includes a digital signature used to authenticate the runtime driver file, and wherein execution of the plurality of machine instructions by the processor further performs the operation of verifying an integrity of the runtime driver file using a digital signature key to determine whether the runtime driver file has been altered from an original form.

24. The computer system of claim 20, wherein the computer system further includes an adapter card operatively coupled to the processor and wherein the platform firmware storage device comprises an option ROM contained on the adapter card.

25. A computer system comprising:

a processor;

a platform firmware storage device, operatively coupled to the processor, in which a runtime driver file corresponding to a platform firmware runtime driver is stored, said runtime driver file comprising opcode that performs a service when called by an operating system interface and type metadata describing type structure information pertaining to the opcode; and a memory in which a plurality of machine instructions are stored that when executed by the processor performs the operations of performing a type certification check of the platform firmware runtime driver by comparing the type structure information corresponding to the opcode against type structure information corresponding to the operating system interface.

26. The computer system of claim 25, wherein the computer system runs an operating system that provides the operating system interface and wherein the type certification check is performed prior to booting the operating system.

27. The computer system of claim 25, wherein execution of the plurality of machine instructions by the processor further performs the operation of loading an executable image corresponding to the platform firmware runtime driver into the memory.

28. The computer system of claim 25, wherein the runtime driver file further includes a digital signature used to authenticate the runtime driver file, and wherein execution of the plurality of machine instructions by the processor further performs the operation of verifying an integrity of the runtime driver file using a digital signature key to determine whether the runtime driver file has been altered from an original form.

29. The computer system of claim 25, wherein the computer system further includes an adapter card operatively coupled to the processor and wherein the platform firmware storage device comprises an option ROM contained on the adapter card.

* * * * *